United States Patent
Forgeron et al.

(10) Patent No.: US 10,619,269 B2
(45) Date of Patent: Apr. 14, 2020

(54) FILAMENTS AND FIBERS AND METHOD FOR MAKING FILAMENTS AND FIBERS

(71) Applicant: POLYSTEEL ATLANTIC LIMITED, Edwardsville (CA)

(72) Inventors: Dean Paul Forgeron, Halifax (CA); Shannon Marie O'Connell, Halifax (CA)

(73) Assignee: POLYSTEEL ATLANTIS LIMITED, Edwardsville (CA)

( * ) Notice: Subject to any disclaimer, the term of this patent is extended or adjusted under 35 U.S.C. 154(b) by 635 days.

(21) Appl. No.: 14/103,383

(22) Filed: Dec. 11, 2013

(65) Prior Publication Data
US 2014/0178686 A1    Jun. 26, 2014

Related U.S. Application Data

(60) Provisional application No. 61/737,308, filed on Dec. 14, 2012.

(51) Int. Cl.
*D01F 8/06* (2006.01)
*B29C 48/18* (2019.01)
(Continued)

(52) U.S. Cl.
CPC ............... *D01F 8/06* (2013.01); *B29C 48/05* (2019.02); *B29C 48/18* (2019.02); *D01F 6/46* (2013.01);
(Continued)

(58) Field of Classification Search
CPC ........... B29C 2947/92676; B29C 2947/92761; B29C 47/0004; B29C 47/0014; B29C 47/06; D01D 5/28; D01D 5/30; D01D 5/34; Y10T 428/2973; Y10T 428/2976; Y10T 442/637; Y10T 442/641; Y10T 428/2929; Y10T 428/2931; D01F 6/46; D01F 6/48;
(Continued)

(56) References Cited

U.S. PATENT DOCUMENTS 6,221,428 B1    4/2001 Modrak
6,376,071 B1    4/2002 Tanaka et al.
(Continued)

FOREIGN PATENT DOCUMENTS

WO    00/22209 A1    4/2000
WO    02/088439 A1    11/2002
(Continued)

OTHER PUBLICATIONS

International Search Report, dated Mar. 21, 2014, for PCT/US2013/074405, 5 pages.
(Continued)

*Primary Examiner* — Jennifer A Steele
(74) *Attorney, Agent, or Firm* — Calfee, Halter & Griswold LLP

(57) ABSTRACT

A fiber is disclosed having a central axis or spline and a major outer surface, the fiber made of a base material and poly(vinylidene fluoride), the proportion of base material to poly(vinylidene fluoride) being greater towards the central axis or spline of the fiber than at the major outer surface of the fiber. The base material may be selected from the group consisting of polyethylene, polypropylene and nylon. The fiber has a surface roughness.

8 Claims, 6 Drawing Sheets

(51) Int. Cl.
- *D01F 6/46* (2006.01)
- *D01F 8/18* (2006.01)
- *B29C 48/05* (2019.01)
- *D01F 6/90* (2006.01)
- *D01F 6/48* (2006.01)
- *D01F 6/92* (2006.01)
- *B29C 48/00* (2019.01)

(52) U.S. Cl.
CPC ............... *D01F 6/48* (2013.01); *D01F 6/90* (2013.01); *D01F 6/92* (2013.01); *D01F 8/18* (2013.01); *B29C 48/022* (2019.02); *B29C 2948/92676* (2019.02); *B29C 2948/92761* (2019.02); *Y10T 428/2976* (2015.01)

(58) Field of Classification Search
CPC ..... D01F 6/90; D01F 6/92; D01F 8/06; D01F 8/12; D01F 8/14; D01F 8/18; D06M 15/256

See application file for complete search history.

(56) References Cited

U.S. PATENT DOCUMENTS

| | | | | |
|---|---|---|---|---|
| 2004/0078903 | A1* | 4/2004 | Bruning | D01F 1/09 8/181 |
| 2007/0173161 | A1* | 7/2007 | Allgeuer | A61L 15/24 442/327 |
| 2010/0291384 | A1* | 11/2010 | Gabriele | D01D 4/06 428/375 |
| 2012/0077405 | A1* | 3/2012 | Zhou | D01D 5/00 442/346 |
| 2013/0068687 | A1* | 3/2013 | Shenoy | D01D 5/0038 210/504 |

FOREIGN PATENT DOCUMENTS

| | | | | |
|---|---|---|---|---|
| WO | WO03004738 | * | 1/2003 | ............... D01F 8/00 |
| WO | 03/022774 A1 | | 3/2003 | |
| WO | 2012/055882 A1 | | 5/2012 | |

OTHER PUBLICATIONS

Written Opinion, dated Mar. 21, 2014, for PCT/US2013/074405, 7 pages.
Office Action from Portuguese Patent Application No. 20151000048527 dated Nov. 17, 2015.

* cited by examiner

FILAMENTS AND FIBERS AND METHOD FOR MAKING FILAMENTS AND FIBERS

BACKGROUND

Technical Field

The present disclosure relates to filaments, fibers and a method of making filaments and fibers.

Description of the Related Art

Bulk material, such as concrete, may be brittle with low tensile strength, and may crack under low strains. Concrete, as an example, may be reinforced, commonly with steel reinforcing bar to provide post cracking tensile capacity. The prior art also includes the use of discrete fibers to reinforce concrete. Fiber reinforced concrete in the prior art commonly uses hydraulic cement, water, aggregates, and short, randomly distributed discrete fibers. Discrete fibers can be used to control cracking behavior, improve impact resistance, and improve toughness. A wide variety of discrete fibers have been used and have been made with varying materials, lengths, shapes and cross sections. Discrete fibers increase mechanical properties of concrete by intersecting and transferring load across cracks. Discrete fibers can also increase concretes cracking resistance in the plastic state by increasing strain capacity of fresh concrete. The ability to transfer loads across cracks is known in the art as pullout resistance, which is fundamental to the performance of fiber reinforced concrete. Fibers in the prior art suffer from insufficient pullout resistance or too much pullout resistance for optimal performance.

To increase pullout resistance, fibers in the prior art have used mechanical anchorage via hooked, turned ends, or dumb-bell shaped ends, or have been designed to form a chemical bond with the concrete matrix itself. Fiber-matrix interfacial bond strength is an important factor in the resulting mechanical properties of synthetic fiber reinforced concrete. Bond components include physical or chemical adhesion, friction, mechanical anchorage or fiber-to-fiber interlock. Adhesion may be increased by increasing surface area or by reducing surface smoothness of fibers. In addition to varying materials or increasing fiber cross sections to take advantage of increased adhesion, manufacturing techniques in the prior art include post extrusion steps of fibrillation, crimping and embossing of surfaces to improve the fiber-matrix bond. Such fibers in the prior art require additional manufacturing steps to impart these hooked ends or surface modifications to the fiber after extrusion of the fiber itself.

BRIEF SUMMARY

A fiber having a central spline and a major outer surface, may be summarized as including a base material and poly (vinylidene fluoride) wherein the proportion of base material to poly(vinylidene fluoride) is greater towards the central axis of the fiber than at the major outer surface of the fiber. The base material may be comprised of an olefin. The base material may be selected from the group consisting of polyethylene, polypropylene, nylon and polyester. The fiber may have a surface roughness.

A fiber may be summarized as including an elongated body comprised of at least a base material and a poly vinylidene fluoride, elongated body having a first end, a second end opposite the first end, a center spline extending between the first end and the second end, and a major outer surface spaced radially outward of the center spline, a ratio of the base material to the poly vinylidene fluoride being greater proximate the center spline than proximate the major outer surface. The base material may be comprised of an olefin. The ratio of the base material to the poly vinylidene fluoride may gradually decrease from the center spline toward the major outer surface.

The fiber may further include maleic anhydride. The base material may be selected from the group consisting of polyethylene, polypropylene, nylon and polyester. The ratio of the base material to the poly vinylidene fluoride may gradually decrease from the center spline toward the major outer surface. The ratio of the base material to the poly vinylidene fluoride may gradually decrease from the center spline toward the major outer surface. The ratio of the base material to the poly vinylidene fluoride may substantially linearly decrease from the center spline toward the major outer surface. The ratio of the base material to the poly vinylidene fluoride may substantially non-linearly decrease from the center spline toward the major outer surface. The outer major surface of the fiber may have a surface roughness.

A method of forming fibers may be summarized as including supplying at least a base material and a polymer vinylidene fluoride to an extruder; extruding an elongated body comprising at least the base material and the poly vinylidene fluoride, elongated body having a first end, a second end opposite the first end, a center spline extending between the first end and the second end, and a major outer surface spaced radially outward of the center spline, a ratio of the base material to the poly vinylidene fluoride being greater proximate the center spline than proximate the major outer surface. Supplying at least a base material and a poly vinylidene fluoride to an extruder may include supplying an olefin to the extruder as the base material. Supplying at least a base material and a poly vinylidene fluoride to an extruder may include supplying at least one of polyethylene, polypropylene, nylon or polyester to the extruder as the base material. Supplying at least a base material and a poly vinylidene fluoride to an extruder may include supplying polyethylene and poly vinylidene fluoride in a ratio of 82% to 18% by weight. Supplying at least a base material and a poly vinylidene fluoride to an extruder may include supplying polyethylene, poly vinylidene fluoride, and maleic anhydride in a ratio of 69% to 11% to 20% by weight. Supplying at least a base material and a poly vinylidene fluoride to an extruder may include supplying polyethylene and poly vinylidene fluoride in a ratio of 78% to 22% by weight. Supplying at least a base material and a poly vinylidene fluoride to an extruder may include supplying polyethylene and poly vinylidene fluoride in a ratio of 80% to 20% by weight. Supplying at least a base material and a poly vinylidene fluoride to an extruder may include supplying polyethylene, poly vinylidene fluoride, and maleic anhydride in a ratio of 70% to 20% to 10% by weight. Supplying at least a base material and a poly vinylidene fluoride to an extruder may include supplying base material and poly vinylidene fluoride in a ratio from approximately 95.5% base material and 0.5% poly vinylidene fluoride by weight to a ratio of approximately 80% base material and 20% poly vinylidene fluoride by weight.

The method may further include melting the base material and the poly vinylidene fluoride prior to extrusion; mixing the melted base material and the poly vinylidene fluoride prior to extrusion; spinning any resulting filaments of the base material and the poly vinylidene fluoride filament following extrusion; drawing the resulting filaments after spinning; and reheating the drawn filaments.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DESCRIPTION OF SPECIFIC EMBODIMENTS

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known materials, structures and methods associated with fiber reinforced material, including concrete, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a", "an", and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
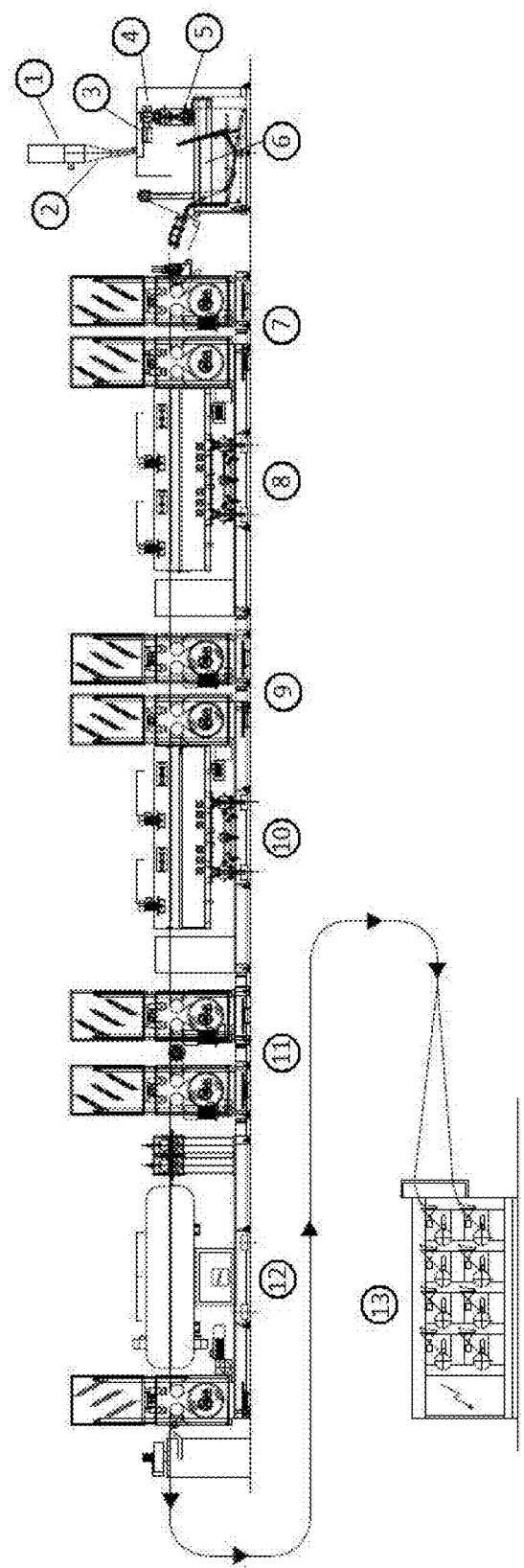
FIG. 1 is a schematic diagram of an extruder line.

The present disclosure discusses synthetic fibers for reinforcing material, such as concrete, comprised of a base synthetic material, comprised of one or more olefins, including such materials as polyethylene (PE), polypropylene (PP), nylon, or polyester and an additive of poly(vinylidene fluoride) (PVDF). PE may include high density polyethylene as well as low density polyethylene. The primary production method for such synthetic fibers is by melt extrusion. The process of extrusion described herein may, for example, be conducted on a commercially available extruder such as the Compact System T20, available from SIMA Group, located at Via Chiesaccia, 2 40056 Crespellano (BO), Italy, based on the teachings provided herein. FIG. 1 shows an extruder line showing 13 elements, each of which may have particular settings to produce a fiber according to one illustrated embodiment.

The filament or fiber material, a mixture of base synthetic material, comprised of one or more olefins such as PE, PP, nylon or polyester, for example, or a blend thereof, with an additive of PVDF may begin as commercially available beads of resin, although other forms of material may be suitable. PP is commercially available from LyondellBasel Industries of Houston, Tex. PE is commercially available from Muehlstein, Toronto, Canada. PVDF is commercially available from Solvay Plastics.

The base material and PVDF are measured by weight and are dropped into a dry mixer (not shown) then through a vacuum system drawn into the hopper 1 near the top of extruder 4. A sensor senses the fiber material and feed 3 draws the fiber material into extruder 4 as it is needed. Melting of the materials takes place as the materials are taken into extruder 4 by an extruder auger within extruder 4 to draw in, heat and melt, and mix resin prior to extrusion through die head 5, creating a viscous two component fluid. The phase transition temperatures of the materials are well known. The viscous multi-component fluid may then be forced by extrusion auger through die head 5 (or spinneret) with one or more orifices to extrude a filament. The extrusion auger may comprise a screw, piston, pump, or other pressure imposing element. Die head 5 may have one or more holes, such that the action of forcing the viscous two component fluid towards the die or spinneret extrudes one or more filaments in parallel.

Temperatures in the melting chamber and through the screw chamber and the speed at which the viscous two-component fluid is forced towards the die, thus extruding filaments, are varied based on the material and the desired properties of the extruded filaments. An example set of operating settings for the Compact System 20 extruder 4 for extruding filaments according to one illustrated embodiment may include 11% PVDF, PE 69%, and MAH (maleic anhydride) 20%; as illustrated in Tables 1A, 1B, and 1C. A person of ordinary skill in the art may select appropriate temperatures and settings for a particular application.

TABLE 1A

| EXTRUDER TEMPERATURES | | | |
|---|---|---|---|
| GROUP STATUS | | ON | |
| ZONE | SP | PV | CURRENT |
| 1 | 055° C. | 030° C. | |
| 2 | 215° C. | 213° C. | 7.6 A |
| 3 | 221° C. | 216° C. | 4.7 A |
| 4 | 218° C. | 215° C. | 4.8 A |
| 5 | 216° C. | 207° C. | 4.9 A |
| 6 | 212° C. | 219° C. | 4.5 A |
| 7 | 206° C. | 211° C. | 6.1 A |
| 8 | 205° C. | 209° C. | 5.0 A |

TABLE 1A-continued

EXTRUDER TEMPERATURES

| GROUP STATUS | ON | | |
|---|---|---|---|
| ZONE | SP | PV | CURRENT |
| 9 | 204° C. | 207° C. | 3.8 A |
| 10 | 199° C. | 207° C. | 2.5 A |
| 11 | 198° C. | 205° C. | 6.1 A |
| 12 | 199° C. | 206° C. | 7.3 A |
| 13 | 195° C. | 029° C. | 0.2 A |
| MELT EXTRUDER | | 219° C. | |
| MELT HEAD | | 228° C. | |
| HEAD ROUND | | | |

TABLE 1B

LINE TEMPERATURES

| | | GROUP STATUS | | |
|---|---|---|---|---|
| | TANK | ALARM | SP 030° C. | PV 037° C. |
| | GROUP STATUS | | SP | PV |
| OVEN | 1 | ON | WATER | |
| AIR SPEED | | | 080% | |
| TEMPERATURE | 3 | | 098° C. | 098° C. |
| OVEN | 2 | ON | WATER | |
| AIR SPEED | | | 075% | |
| TEMPERATURE | 3 | | 088° C. | 088° C. |
| OVEN | 3 | ON | | |
| AIR SPEED | | | 075% | |
| TEMPERATURE | 1 | | 090° C. | 090° C. |

TABLE 1B-continued

LINE TEMPERATURES

| | | GROUP STATUS | | |
|---|---|---|---|---|
| | TANK | ALARM | SP 030° C. | PV 037° C. |
| | GROUP STATUS | | SP | PV |
| TEMPERATURE | 2 | | 090° C. | 090° C. |
| TEMPERATURE | 3 | | 090° C. | 090° C. |
| TEMPERATURE | 4 | | 090° C. | 090° C. |

TABLE 1C

LINE SPEEDS

| LINE SPEED RAMP | | | | | | | | |
|---|---|---|---|---|---|---|---|---|
| SETTING 045% | (max) 061% | RAMP TIME | SECURITY PRESSURE | 105 bar | WORK PRESSURE | 050 bar | HEAD PRESSURE | 156 bar |
| ACTUAL 045% | | 02 min. | | | | | | |

| | | | SETTING AT FULL SPEED | SETTING RAMPED | SPEED FEEDBACK | MOTOR TORQUE | MOTOR CURRENT | GROUP STATUS |
|---|---|---|---|---|---|---|---|---|
| EXTRUDER | | (125 rpm) Manual AUTOMATIC (250 bar) | 0.0 rpm 050 bar | | 35.2 rpm | 47.17% | 26.1 A | ON |
| PUMP | | (65 rpm) | 45.1 rpm | 20.3 rpm | 20.3 rpm | 55.09% | 3.8 A | ON |
| SLOW STRETCHING | 1 | (60 m/1') | 11.2 m/1' | 5.0 m/1' | 5.0 m/1' | 2.76% | 2.2 A | ON |
| SLOW STRETCHING | 2 | (60 m/1') | 11.3 m/1' | 5.1 m/1' | 5.1 m/1' | -13.58% | 2.4 A | ON |
| FAST STRETCHING | 1 | (180 m/1') | 102.3 m/1' | 46.0 m/1' | 46.0 m/1' | 10.57% | 6.5 A | ON |
| FAST STRETCHING | 2 | (180 m/1') | 102.3 m/1' | 46.0 m/1' | 46.0 m/1' | -0.38% | 6.1 A | ON |
| FAST STRETCHING | 3 | (180 m/1') | 115.6 m/1' | 52.0 m/1' | 52.0 m/1' | 18.30% | 6.8 A | ON |
| FAST STRETCHING | 4 | (180 m/1') | 115.6 m/1' | 52.0 m/1' | 52.0 m/1' | 44.76% | 7.7 A | ON |
| HAUL-OFF GODET | | (180 m/1') | 112.8 M/1' | 50.8 m/1' | 50.8 m/1' | 41.89% | 4.3 A | ON |
| TOTAL DENIER | | 054000 den | | | | | | |

| | | STRETCHING RATIO | | ANNEALING RATIO |
|---|---|---|---|---|
| PRODUCTION | 31 Kg/h | 1 | 9.13% | |
| TOTALIZER | 872 Kg | 2 | 1.13% | |
| | | TOTAL | 10.32% | 2.42% |

The extrusion auger may create pulsing and uneven flow of filament material to die head 5, so a gear pump (not shown) may be used to control the pressure and flow rate on the material as it reaches the die head. Further, varying the gear pump speeds can be used to vary the cross sectional dimensions of the resulting filaments or fibers. A person of ordinary skill in the art may select an appropriate pressure for a particular application.

Orifices in die head 5 can vary in number and shape, including cross section, which can be used to tailor the size and geometric shape of the resulting filaments or fibers and may depend on the nature of the material being extruded. Fibers or filaments, as used herein, may also include sheets of material or other shapes. A person of ordinary skill in the art may select an appropriate die head for a particular application.

When the filaments exit from the die or from the spinneret, the filaments are a semi-solid polymer, and are made into their final conformation, form or shape through a process known in the art as spinning. Methods of spinning generally used may include; wet spinning, dry spinning, gel spinning, and melt spinning. These methods vary in economics for the particular materials used.

In an example of melt spinning, the material solidifies by cooling via a cooling air or a water bath. Melt spinning is often used for materials that are melted before passing through the spinneret, such as described herein, After cooling via the air or water bath, fibers may then pass to spindles, or godets 7, 9, and 11, and one or more stretch ovens 8, 10 where the fibers may be drawn and reheated. The fibers can be heated and godets 7, 9, 11 may be moved or set with speed differential to stretch the fibers to increase the uniaxial molecular orientation and tensile strength. Fibers may then pass through a heated annealing area or annealing oven 12 to anneal the fibers. In the stretch ovens 8, 10, the temperature is changed based on the fiber geometry required for a particular application. The amount of stretching depends on the temperature and the cross-section of the fiber, for example. Such should allow sufficient heating of the fiber as the fiber runs through the oven to allow mobility of the molecular chains, thus allowing stretching and alignment by godets 7, 9, 11. Settings would vary depending on the extruder line, different extrusion dies, etc. As noted, a person of ordinary skill in the art may determine appropriate temperatures for their particular configuration and application.

Filaments may then be wound on spindles or bobbins 13 or twisted into bundles or other conformation, forms or shapes, for storage and transportation. Filaments may alternatively or additionally be cut to specific lengths, depending on the desired application. The fibers will be formed with a central axis or spline which runs generally parallel to the direction of the direction of extrusion and a major surface which circumscribes the central axis or spline.

A person of ordinary skill in the art will appreciate proper temperatures for a specific application. The screw speed and temperatures within the melt screw chamber may be set according to the melting temperatures of varying materials. The pump speed and stretch ratio may be varied to achieve the desired cross sectional size. Stretch ratios vary depending on the materials and fiber geometry. FIG. 1A shows parameters for the extruder for at least one particular embodiment.

PP and PE are generally hydrophobic and PVDF is generally hydrophilic. It has been found that when extruded, as described herein, the PVDF generally self assembles towards the outside of the fiber and the base material self assembles towards the inside of the fiber producing a gradient of higher concentration of base material towards the core or central axis or central spline of the fiber, with a higher concentration of PVDF towards the outside of fiber at the major exposed surface of the fiber. The PVDF towards the exterior of the fiber tends to create a textured or roughened surface, which increases the mechanical adhesion within the concrete matrix, which in turn, increases pullout resistance. Further, PVDF has greater chemical bond with the concrete matrix than the olefin base material. The greater concentration of PVDF toward the exterior of the fiber increases pull-out resistance and fiber reinforcement performance via this chemical bond. The base material provides greater fiber strength than pure PVDF and are typically less expensive than PVDF.

Ratios of, by weight of 0.5% PVDF to 95.5% base material, up 22% PVDF to 78% base material have produced desirable results. For example, the following have been tested and have shown to produce desirable results.

PE 82% to PVDF 18%,
PE 69% to PVDF 11% to MAH (maleic anhydride) 20%;
PP 78% to PVDF 22%;
PP 80% to PVDF 20%; and
PP 70% to PVDF 10% to MAH 20%.

Ratios of PE 82% to PVDF 18%, and PP 78% to PVDF 22% create a fiber with a specific gravity greater than 1, and thus the fiber would sink in water rather than floating on the surface. The addition of MAH helps reduce any PVDF from accumulating on the die head of the extruder. It is believed that ratios of up to 50% PVDF to base material will have the same desirable qualities.

Figure 2:
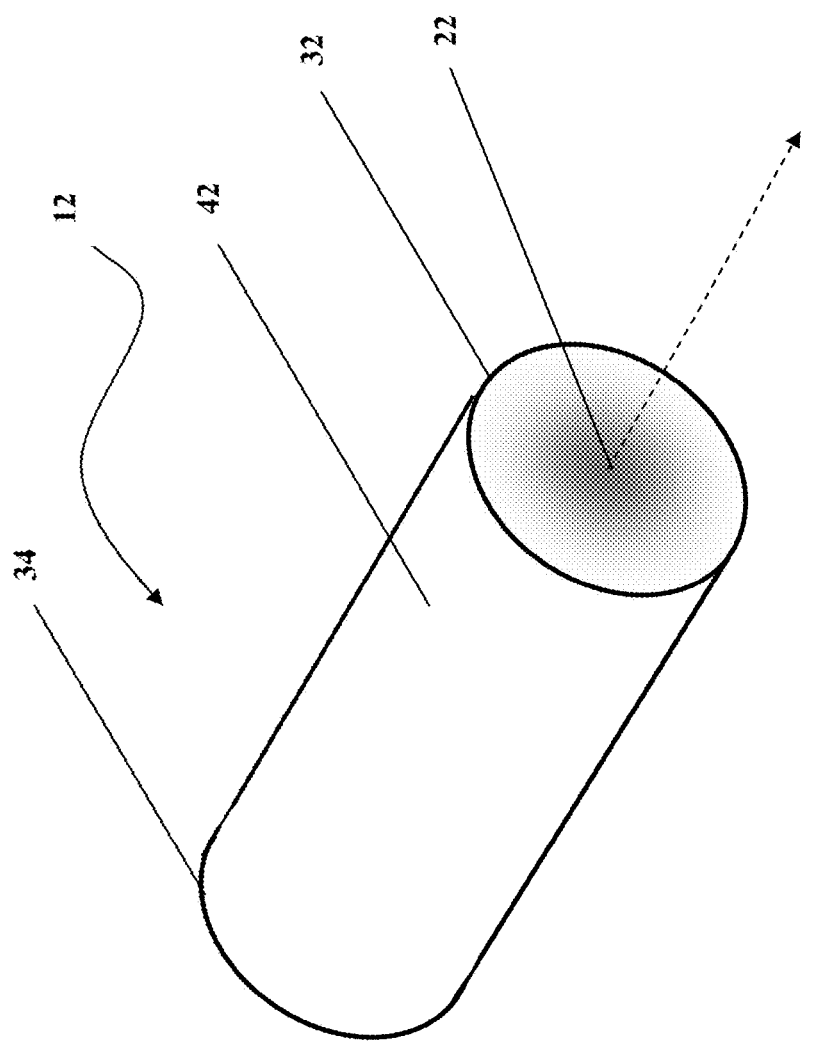
FIG. 2 is a perspective cross section of a fiber according to one illustrated embodiment.

FIG. 2 a fiber 12 according to one illustrated embodiment having a first end 32 and a second end 34. In this embodiment, the proportion of the base material to PVDF generally increases towards the central axis or spline 22 of the fiber 12 (spline 22 illustrated by a dashed arrow) from the major surface 42. This increase may be a linear gradient or may be a non-linear gradient. The increase may also be continuous or non-continuous and may generally increase while yet having local decreases. The gradient need not be uniform along central axis 22 of fiber 12 and need not be uniform radically or isotropic from central axis 22 towards major surface 42.

While FIG. 2 shows cross sections that are generally circular, this is for illustrative purposes only and the fiber can have any desirable cross section, dependent on such factors as the shape of the die used to extrude the fiber. The ratio of the length of the fiber to the diameter of the cross section of the fiber is for illustration purposes only. A person of ordinary skill in the art may select any cross section, length, diameter, or length to diameter ratio that is desired.

Figure 3:
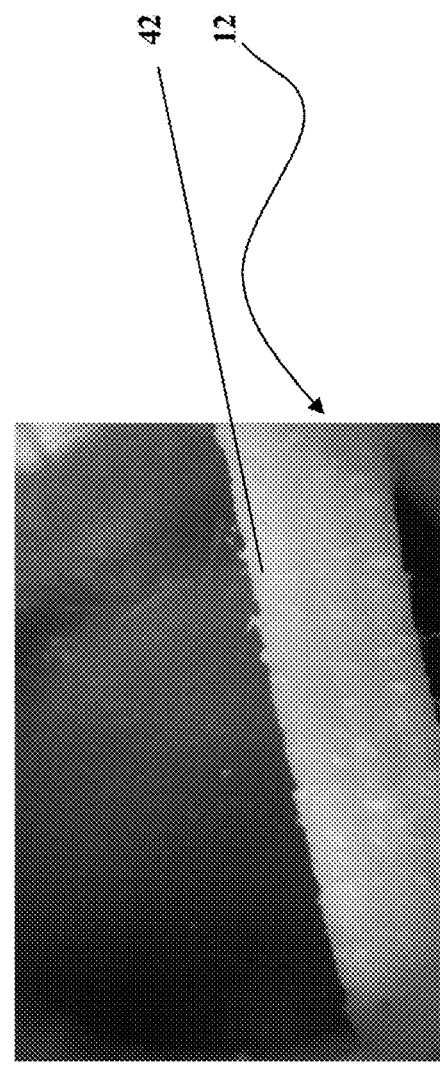
FIG. 3 is a photograph of a fiber according to another illustrated embodiment.

FIG. 3 shows a fiber according to one illustrated embodiment showing the textured major surface 42 of fiber 12.

To fully compare and characterize different synthetic fibers, several tests were conducted. These were fiber tensile testing, single fiber pullout testing, testing of fiber performance in fiber reinforced concrete mixtures, and tensile creep testing.

Tensile testing was conducted according to ASTM D2256-10 and EN 14880-2: 2006 using an Instron 8501 machine with up to a 100 kN load cell and an Instron 8500+ controller. A load was applied by stretching the fiber at a constant rate of 200 mm/min.

Figure 4:
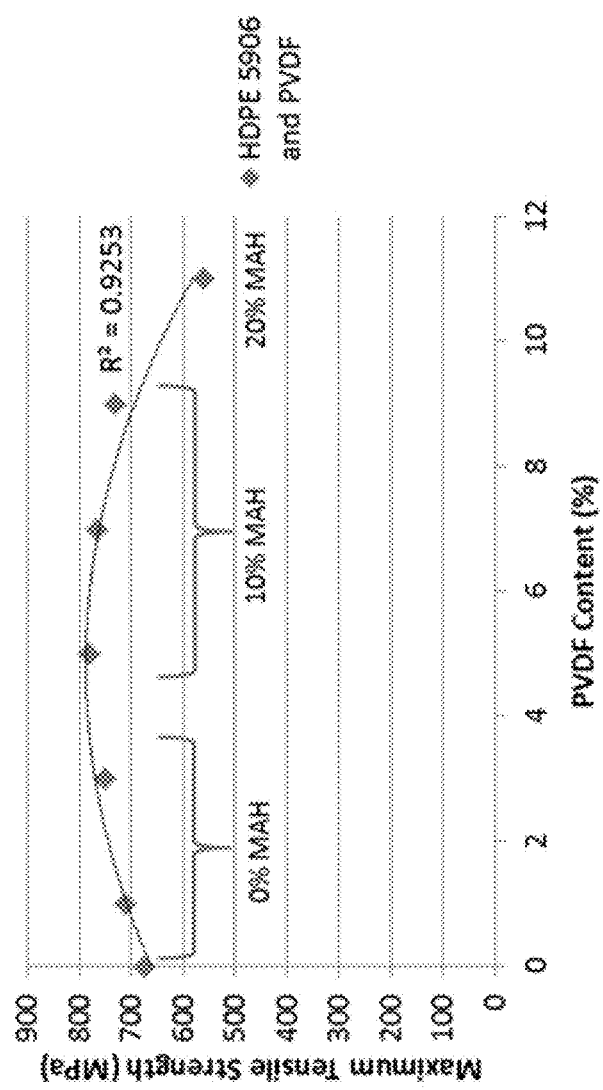
FIG. 4 is a graph of maximum tensile strength vs. poly (vinylidene)fluoride (PVDF) content for fibers according to certain illustrated embodiments.

Pullout testing was conducted using an Instron 8501 machine with a 5 kN load cell and an Instron 8500+ controller at various angles FIG. 4 shows a plot 400 of maximum tensile strength versus PVDF content for various concentrations of PVDF with HDPE 5906 as a base material, with MAH additive as required.

Figure 5:
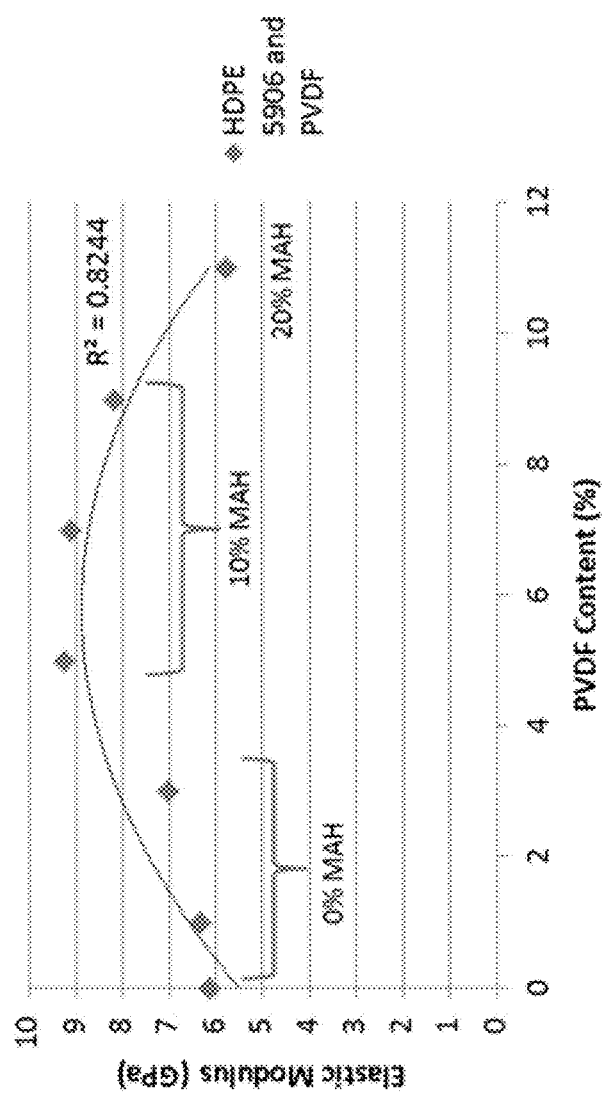
FIG. 5 is a graph of elastic modulus vs. PVDF content for fibers according to certain illustrated embodiments.

FIG. 5 shows a plot 500 of elastic modulus versus PVDF content for various concentrations of PVDF with HDPE 5906 as a base material, with MAH additive as required.

By adding PVDF to HDPE, higher stretch ratios were achieved than with PVDF alone. Therefore, PVDF addition slightly improved the tensile properties of the fiber, as shown in FIG. 4 and FIG. 5. It is expected that the addition of less than 10% PVDF does not cause a loss in tensile properties and may result in a slight improvement.

Figure 6:
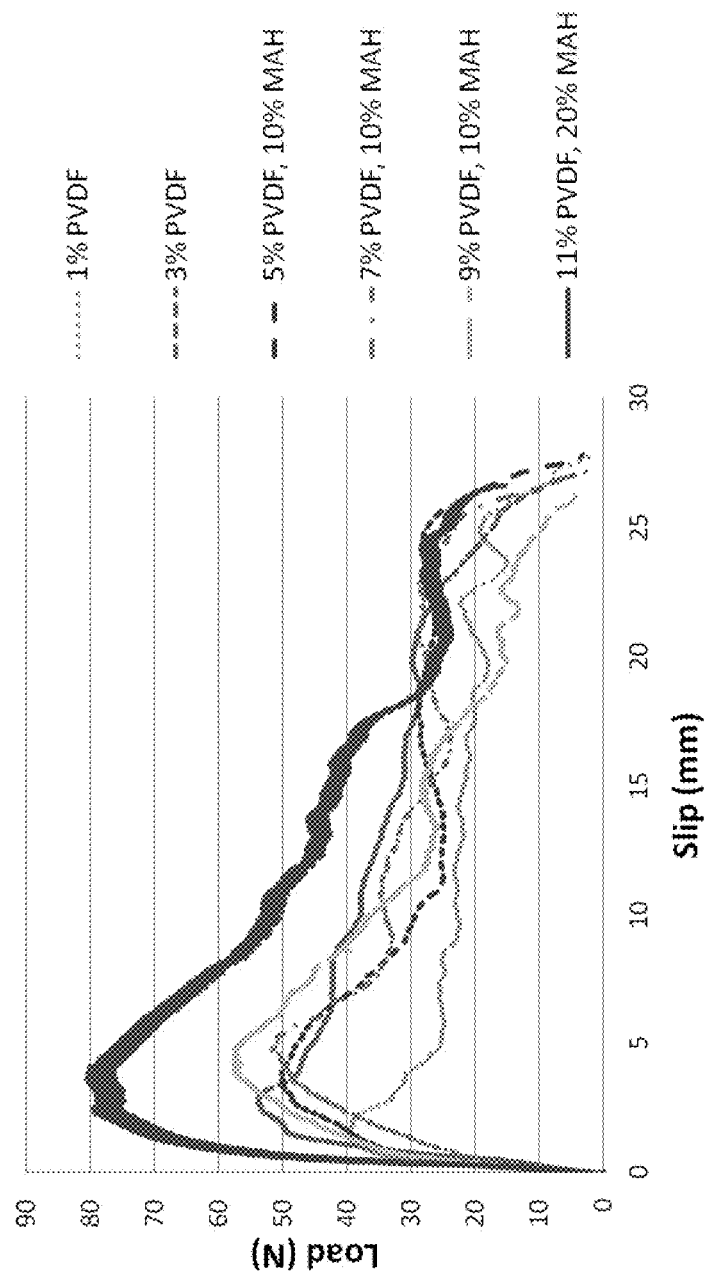
FIG. 6 is a graph of pullout load vs. slip distance for fibers according to certain illustrated embodiments.

FIG. 6 shows a graph of pullout load versus slip distance for a number of different fibers, according to various illustrated embodiments. In particular, a performance of a fiber comprised of approximately 11% PVDF, 20% MAH and 68% HDPE is illustrated by a first pull out curve 602. A performance of a fiber comprised of approximately 9% PVDF, 20% MAH and 71% HDPE is illustrated by a second pull out curve 604. A performance of a fiber comprised of approximately 7% PVDF, 10% MAH and 83% HDPE is illustrated by a third pull out curve 606. A performance of a fiber comprised of approximately 5% PVDF, 10% MAH and 85% HDPE is illustrated by a fourth pull out curve 608 A performance of a fiber comprised of approximately 3% PVDF and 97% HDPE is illustrated by a fifth pull out curve 610. A performance of a fiber comprised of approximately 1% PVDF and 99% HDPE is illustrated by a sixth pull out curve 612. Notably, the fiber comprised of approximately 11% PVDF, 20% MAH and 68% HDPE had the largest pullout resistance. The pullout curves 602-612 also show the peak load achieved at early slip values, indicating a chemical bond, followed by a steady decrease in load when the fiber has fully debonded, indicating a constant friction mechanism and that the increased surface roughness increases pullout resistance.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other fiber reinforced materials, not necessarily the exemplary methods and apparatus generally described above. For example, the various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to U.S. Provisional Patent Application No. 61/737,308, filed Dec. 14, 2012 are incorporated herein by reference, in their entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fiber having a central spline and a major outer surface, said fiber being comprised of about 68-82 wt. % of a hydrophobic polyethylene base material comprised of one or more olefins, about 0.5-22 wt. % of a hydrophilic polymer, and about 10-20 wt. % of maleic anhydride; wherein the proportion of the base material to the polymer substantially linearly decreases from the central axis of the fiber to the major outer surface of the fiber.

2. The fiber of claim 1, wherein the fiber has a surface roughness.

3. A fiber, comprising:
an elongated body comprised of at least about 78-82 wt. % of a hydrophobic polyethylene base material, about 18-22 wt. % of poly vinylidene fluoride, and about 10-20 wt. % of maleic anhydride, the elongated body having a first end, a second end opposite the first end, a center spline extending between the first end and the second end, and a major outer surface spaced radially outward of the center spline, wherein a ratio of the base material to the poly vinylidene fluoride gradually decreases from the center spline to the major outer surface.

4. The fiber of claim 3, wherein the gradual decrease in the ratio of the base material to the poly vinylidene fluoride from the center spline toward the major outer surface is linear.

5. The fiber of claim 3, wherein the outer major surface of the fiber has a surface roughness.

6. The fiber of claim 1, wherein the polymer is poly vinylidene fluoride.

7. The fiber of claim 6, wherein the fiber has a maximum tensile strength between about 550 MPa and about 800 MPa.

8. The fiber of claim 6, wherein the fiber has an elastic modulus between about 5.75 GPa and about 9.25 GPa.

* * * * *